United States Patent
Park et al.

(10) Patent No.: US 12,246,729 B2
(45) Date of Patent: Mar. 11, 2025

(54) METHOD AND SYSTEM FOR ANALYZING OPERATION RECORD, AND OPERATION RECORD DEVICE

(71) Applicant: STAR PICKERS. INC., Seoul (KR)

(72) Inventors: Choo Jin Park, Seoul (KR); Kyung Mok Kim, Seoul (KR)

(73) Assignee: STAR PICKERS. INC., Seoul (KR)

( * ) Notice: Subject to any disclaimer, the term of this patent is extended or adjusted under 35 U.S.C. 154(b) by 143 days.

(21) Appl. No.: 17/917,869

(22) PCT Filed: Apr. 8, 2021

(86) PCT No.: PCT/KR2021/004453
§ 371 (c)(1),
(2) Date: Oct. 7, 2022

(87) PCT Pub. No.: WO2021/206489
PCT Pub. Date: Oct. 14, 2021

(65) Prior Publication Data
US 2023/0148350 A1    May 11, 2023

(30) Foreign Application Priority Data

Apr. 8, 2020 (KR) .......... 10-2020-0042980
Aug. 13, 2020 (KR) .......... 10-2020-0102067

(51) Int. Cl.
*G06V 20/56* (2022.01)
*B60W 40/09* (2012.01)
*B60W 40/06* (2012.01)

(52) U.S. Cl.
CPC .......... *B60W 40/09* (2013.01); *G06V 20/588* (2022.01); *B60W 2540/30* (2013.01)

(58) Field of Classification Search
CPC ...... G06V 20/56; G06V 20/588; G06V 10/82; B60W 40/06; B60W 40/09; G07C 5/08; G07C 5/00; B60R 16/02
See application file for complete search history.

(56) References Cited

U.S. PATENT DOCUMENTS 9,711,080 B2 * 7/2017 Kang .................... G09G 3/3225
2018/0164812 A1 * 6/2018 Oh ........................... G06N 3/02
(Continued)

FOREIGN PATENT DOCUMENTS

GB        2550378    * 11/2017    ............... G08G 1/16
JP    2013-206031 A   10/2013
(Continued)

OTHER PUBLICATIONS

International Search Report and Written Opinion; Application No. PCT/KR2021/004453; dated Jul. 1, 2021.
(Continued)

*Primary Examiner* — Tan Q Nguyen
(74) *Attorney, Agent, or Firm* — Fitch, Even, Tabin & Flannery LLP

(57) ABSTRACT

According to an aspect of the present disclosure, there is provided a method including: obtaining, from the electronic device, at least one of acceleration data, geomagnetic data, and gyro data of the electronic device; and determining, based on the obtained data, a pattern of a road below the electronic device. The electronic device may be installed in a vehicle, for example, a two-wheeled vehicle or a micro-mobility vehicle. The method may further include determining a driving state of the vehicle based on the pattern of the road on which the vehicle is driving. A system configured to perform the method may be provided.

15 Claims, 9 Drawing Sheets

(56) References Cited

U.S. PATENT DOCUMENTS

| | | | | |
|---|---|---|---|---|
| 2019/0179320 A1* | 6/2019 | Pacala | ............... | G01C 21/30 |
| 2019/0283763 A1* | 9/2019 | Wang | ............... | G07C 5/08 |
| 2021/0070309 A1* | 3/2021 | Kodali | ............... | B60W 50/14 |
| 2021/0279480 A1* | 9/2021 | Goto | ............... | G06F 16/245 |
| 2021/0364632 A1* | 11/2021 | Sagalovich | ............... | G06V 20/58 |

FOREIGN PATENT DOCUMENTS

| | | | |
|---|---|---|---|
| JP | 2017-206242 A | 11/2017 |
| KR | 10-2017-0090974 A | 8/2017 |
| KR | 10-2018-0068511 A | 6/2018 |
| KR | 10-2018-0136229 A | 12/2018 |
| KR | 10-2019-0115040 A | 10/2019 |
| WO | 2018/161774 A1 | 9/2018 |

OTHER PUBLICATIONS

"Announcement of In-depth Interview Results for Social Enterprise Promotion Project 2020," Delivery Service Without Any Accidents, Feb. 4, 2020, pp. 1-8.

\* cited by examiner

METHOD AND SYSTEM FOR ANALYZING OPERATION RECORD, AND OPERATION RECORD DEVICE

CROSS-REFERENCE TO RELATED APPLICATIONS

This application is a U.S. national phase application filed under 35 U.S.C. § 371 of International Application No. PCT/KR2021/004453, filed Apr. 8, 2021, which is based upon and claims the benefit of priority from the prior Korean Application No. 10-2020-0042980, filed Apr. 8, 2020, and prior Korean Application No. 10-2020-0102067, filed Aug. 13, 2020.

FIELD OF THE INVENTION

The present disclosure relates to a method and system for analyzing an operation record, and an operation record device. Particularly, the present disclosure relates to a method and system for analyzing an operation record, based on artificial intelligence, and an operation record device used therein. The present disclosure relates to a system for analyzing sensing data transmitted from an operation record device. The present disclosure relates to an artificial intelligence (AI) system utilizing a machine learning algorithm, such as deep learning, and an application of the AI system.

BACKGROUND OF THE INVENTION

As electrically powered personal mobility, such as electric unicycles, electric kick scooters, electric skateboards, or electric bicycles, for example, micromobility and smart mobility, has been popularized and shared mobility platform providers has engaged in the personal mobility market, the number of users of personal mobility is significantly increasing. In addition, as the pandemic is making the delivery market significantly larger, the number of two-wheeled vehicle drivers is also significantly increasing.

However, personal mobility drivers often drive on sidewalks with poor driving skills, which poses a great threat to pedestrians. In addition, two-wheeled delivery vehicle drivers tend to drive recklessly due to delivery competition, which poses a great threat to the safety of not only the drivers but also pedestrians. In particular, personal mobility vehicles or two-wheeled vehicles may drive not only on roads but also on sidewalks, which can lead to serious accidents.

Meanwhile, when a four-wheeled vehicle gets into an accident, a dashboard camera installed in the four-wheeled vehicle may be helpful to determine environments around the accident. However, it is difficult for a personal mobility vehicle or a two-wheeled vehicle to continuously supply power to a dashboard camera, and thus, a mobile device, such as a smart phone or camera of a driver, is used, rather than installing a dashboard camera in the vehicle.

An artificial intelligence (AI) system is a computer system that implements human-level intelligence, and allows a machine to learn by itself, make decisions, and become smarter, unlike an existing rule-based smart system. As the AI system is used, the AI system has an improved recognition rate and accurately understands a user's preference, and accordingly, the existing rule-based smart systems is are gradually being replaced with deep-learning-based AI systems.

DESCRIPTION OF EMBODIMENTS

The embodiments of the present disclosure are to ensure the safety of a vehicle (e.g., a two-wheeled vehicle, a personal mobility vehicle, etc.), a driver thereof, and pedestrians.

The embodiments of the present disclosure are to evaluate the safety of a driver of a vehicle.

The embodiments of the present disclosure are to determine whether a vehicle has gotten into an accident, and report the accident.

The embodiments of the present disclosure are to determine whether a vehicle is abnormal and notify a user or a third party of a result of the determining.

According to an aspect of the present disclosure, there is provided a method including: obtaining, from the electronic device, at least one of acceleration data, geomagnetic data, and gyro data of the electronic device; and determining, based on the obtained data, a pattern of a road below the electronic device.

According to an aspect of the present disclosure, there may be provided a computer-readable recording medium having recorded thereon a program that causes a computer to perform the method.

According to an aspect of the present disclosure, there may be a provided a system including: a memory storing instructions; and at least one processor configured to execute the instructions to obtain, from an electronic device, at least one of acceleration data, geomagnetic data, and gyro data of the electronic device, and determine, based on the obtained data, a pattern of a road below the electronic device.

According to an aspect of the present disclosure, there is provided an electronic device including: at least one sensor configured to output at least one of acceleration data, geomagnetic data, and gyro data; and at least one processor configured to collect the output data such that a pattern of a road below the electronic device is determined based on the output data.

DETAILED DESCRIPTION OF THE PREFERRED EMBODIMENTS

Figure 1:
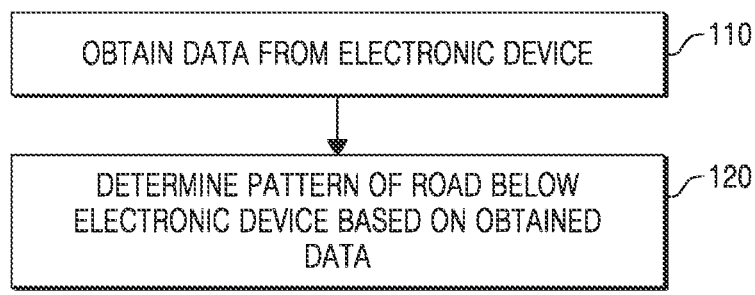
FIG. 1 is a flowchart of an operation record analysis method according to an embodiment.

Hereinafter, example embodiments according to the present disclosure are described in detail with reference to the accompanying drawings. In addition, a method of configuring and using an electronic device according to an embodiment of the present disclosure are described in detail with reference to the accompanying drawings. Like reference numerals in the drawings indicate parts or components that perform substantially the same functions.

Terms such as "first" or "second" may be used to describe various elements, but the elements are not limited by the terms. These terms are only used to distinguish one element from another element. For example, a first element may be referred to as a second element, and a second element may be referred to as a first element in a similar manner, without departing from the scope of the present disclosure. As used herein, the term "and/or" includes any and all combinations of one or more of the associated listed items.

Terms used herein are for describing embodiments and are not intended to limit the scope of the present disclosure. The singular expression also includes the plural meaning as long as it is not inconsistent with the context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Expressions such as "at least one" modifies the entirety of a list of elements, and does not individually modify the elements. For example, the expression "at least one of A, B, and C" indicates only A, only B, only C, both A and B, both B and C, both A and C, all of A, B, and C, or combinations thereof.

When an element is referred to as being "connected to" another element, it may be "directly connected to" the other element or be "electrically connected to" the other element through an intervening element. In addition, when an element is referred to as "including" a component, the element may additionally include other components rather than excluding other components as long as there is no particular opposing recitation. Also, as used herein, the terms such as " . . . er (or)", " . . . unit", " . . . module", etc., denote a unit that performs at least one function or operation, which may be implemented as hardware or software or a combination thereof.

FIG. 1 is a flowchart of an operation record analysis method according to an embodiment.

In operation 110, an operation record analysis system may obtain data from an electronic device. In an embodiment, the electronic device may be an operation record device. The components of the electronic device are described below with reference to FIG. 2.

In an embodiment, the electronic device may be installed in a vehicle, and data obtained from the electronic device may vary depending on the movement of the vehicle. The electronic device may be installed in various locations in the vehicle. For example, the electronic device may be installed inside or outside the vehicle. For example, the electronic device may be installed on the frame of the vehicle. The electronic device may be installed on the steering wheel of the vehicle. The electronic device may be installed on the bottom of the vehicle (e.g., the upper surface, lower surface, side surface, front surface, or rear surface of the bottom). The electronic device may be installed in the vehicle in various manners depending on its shape. For example, the electronic device may be installed on a flat surface of the vehicle, or on a curved surface of the steering wheel or frame of the vehicle. The electronic device may be installed to surround the steering wheel or frame of the vehicle. An installation member may be between the electronic device and the vehicle. The vehicle may be, but is not limited to, a two-wheeled vehicle, a personal mobility vehicle, a micro-mobility vehicle, a smart mobility vehicle, or the like.

Throughout the present specification, the electronic device may also be referred to as a first electronic device.

In an embodiment, the data obtained from the electronic device may be at least one of acceleration data, geomagnetic data, and gyro data of the electronic device. The data, which is obtained from the electronic device and includes at least one of acceleration data, geomagnetic data, and gyro data, may be referred to as motion sensing data. For example, the data obtained from the electronic device may include, but is not limited to, acceleration data and gyro data of the electronic device. For example, the data obtained from the electronic device may include acceleration data, gyro data, and geomagnetic data of the electronic device. The motion sensing data of the electronic device may be referred to as first motion sensing data of the first electronic device.

As the amount of data to be analyzed decreases, the time period required to completely analyze the data may decrease. As the amount of data to be analyzed increases, the accuracy of analysis of the data may increase. That is, there is a trade-off between the analysis time and the analysis accuracy, and thus, the amount of data to be analyzed may be appropriately set according to an embodiment. Meanwhile, the electronic device collects the data, and thus, as the amount of data to be analyzed increases, the burden on the electronic device may increase. That is, there is a trade-off between the amount of collected data and the resource of the electronic device, and thus, the amount of data to be collected and analyzed may be appropriately set according to an embodiment. The amount of data collected by the electronic device may be adjusted by adjusting a sensing period of the electronic device. That is, as the sensing period of the electronic device decreases, the amount of collected data may increase.

In operation 120, the operation record analysis system may determine a pattern of a road below the electronic device based on the data.

In an embodiment, the data used by the operation record analysis system to determine the pattern of the road below the electronic device may further include other types of data in addition to the data obtained from the electronic device. This is described below with reference to FIGS. 4 to 6.

In an embodiment, the road below the electronic device may be a road on which the vehicle installed with the electronic device is driving. That is, the data obtained from the electronic device may vary depending on the characteristics of the road on which the vehicle installed with the electronic device is driving. Accordingly, the pattern of the road on which the vehicle installed with the electronic device is driving may be determined by using the data obtained from the electronic device.

In an embodiment, according to the determining of the pattern of the road below the electronic device, it may be determined whether the road under the electronic device is a roadway or a sidewalk. For example, it may be determined whether the pattern of the road is similar to the pattern of a roadway or is similar to the pattern of a sidewalk. For example, it may be determined whether the pattern of the road is more similar to the pattern of a roadway or a sidewalk. In a case in which it is determined that the road below the electronic device is a sidewalk, a message may be transmitted to the driver of the vehicle and/or a third party for notifying that the vehicle is driving on the sidewalk. Accordingly, the driver of the vehicle may recognize that he or she is driving on the sidewalk, such that the driver of the vehicle avoids driving on the sidewalk. The third party may be, but is not limited to, a person who may give economic or social disadvantages to the driver of the vehicle driving on a sidewalk, such as the lessor of the vehicle, the manager of the driver, the employer of the driver, a user, an insurer, an operator, a controller, an delivery agent, or the like. The notification to the third party may require the driver's consent.

Accordingly, the driver of the vehicle would want to avoid disadvantages due to his or her driving on the sidewalk, and thus avoid driving on the sidewalk. According to an embodiment, the number of times the driver drives on a sidewalk may be counted, and it may be determined, based on an accumulated result of the counting, whether the driver is driving safely. That is, the operation record analysis system may be implemented to evaluate the driver as a reckless driver when the number of times the driver drives a sidewalk is absolutely high or relatively high. The driver may be induced to drive safely in order to avoid being evaluated as a reckless driver.

Figure 2:
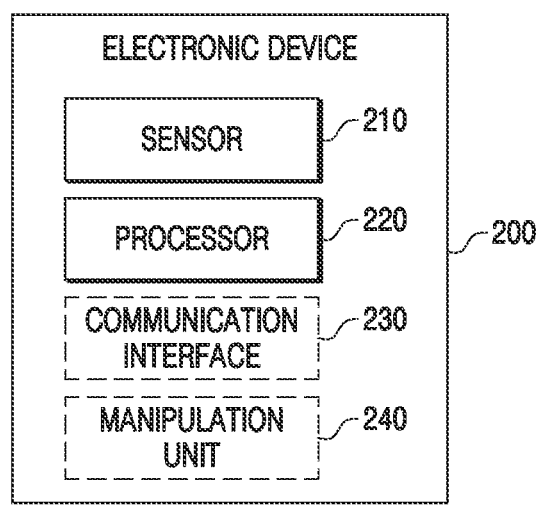
FIG. 2 is a block diagram of an electronic device according to an embodiment.

FIG. 2 is a block diagram of an electronic device according to an embodiment.

Referring to FIG. 2, an electronic device 200 may include a sensor 210 and a processor 220. In an embodiment, the electronic device 200 may further include a communication interface 230. In an embodiment, the electronic device 200 may further include a manipulation unit 240. In an embodiment, the electronic device 200 may further include a memory. Software modules of the device 200, for example, program modules, may be stored in the memory as a set of instructions, and the processor 220 may execute the instructions to perform functions corresponding thereto.

The sensor 210 of the electronic device 200 may be a sensor for obtaining at least one of acceleration data, geomagnetic data, and gyro data of the electronic device 200. In an embodiment, the sensor 210 may be an acceleration sensor, a gyro sensor, a geomagnetic sensor, or a combination thereof. For example, the sensor 210 may be a 6-axis inertial measurement unit (IMU) in which a 3-axis acceleration sensor and a 3-axis gyro sensor are combined with each other. For example, the sensor 210 may be a 9-axis IMU in which a 3-axis acceleration sensor, a 3-axis gyro sensor, and a 3-axis geomagnetic sensor are combined with each other.

Through the sensor 210 of the electronic device 200, a motion of the electronic device 200 or a vehicle installed with the electronic device 200 may be detected.

The processor 220 of the electronic device 200 may control the overall operation of the components of the electronic device 200. The processor 220 may obtain data detected by the sensor 210. The processor 220 may collect the data detected by the sensor 210. The processor 220 may store the collected data in the memory. The processor 220 may transmit the collected data (or the stored data) through the communication interface 230.

The electronic device 200 may transmit data to the outside through the communication interface 230 of the electronic device 200. The electronic device 200 may transmit sensing data to a user device through the communication interface 230 of the electronic device 200 or may transmit the sensing data to an analysis system. The electronic device 200 may be connected to the user device and/or the analysis system through the communication interface 230. The communication interface 230 may be a wireless communication interface or a wired communication interface. The communication interface 230 may be a short-range communication interface, for example, a Bluetooth interface or a Wi-Fi interface. The communication interface 230 may be a long-range communication interface. In an embodiment, the electronic device 200 may include the communication interface 230, which is a short-range communication interface (e.g., a Bluetooth communication interface), and may not include a long-range communication interface (e.g., a cellular communication interface). Accordingly, the power consumption of the electronic device 200 may be reduced. In this case, the electronic device 200 may transmit the sensing data to the user device through the short-range communication interface, and the sensing data may be transmitted to the analysis system through the long-range communication interface of the user device. In an embodiment, the electronic device 200 includes a long-range communication interface and may not include a short-range communication interface. In this case, the sensing data may be directly transmitted to the analysis system through the long-range communication interface of the electronic device 200. Transmission of sensing data to the analysis system by the electronic device 200 through the user device is described below with reference to FIG. 3A. Direct transmission of sensing data to the analysis system by the electronic device 200 is described below with reference to FIG. 3B. In an embodiment, the electronic device 200 may include both a short-range communication interface and a long-range communication interface. The short-range and long-range communication interfaces are not limited to the above-described Bluetooth communication interface and cellular communication interface, and may be other appropriate communication interfaces with the development of the technology.

In an embodiment, the user device is a device connected to the electronic device, and may include a smart phone, a tablet, a mobile phone, a personal digital assistant (PDA), a media player, a portable multimedia player (PMP), an electronic book terminal, a digital broadcasting terminal, and a personal computer (PC), a laptop computer, a global positioning system (GPS) device, a navigation device, an MP3 player, a digital camera, and other mobile computing devices. In the present disclosure, for convenience of description, it is assumed that the user device is a smart phone.

In an embodiment, the electronic device 200 may further include the communication interface 230. The electronic device 200 may transmit data to the user device through the communication interface 230. The electronic device 200 may include a battery. The communication interface 230 may be a universal serial bus (USB) interface, and the electronic device 200 may be supplied with power from and communicate with the user device through the USB interface. Data may be transmitted to the operation record analysis system through the communication interface 230. The communication interface 230 and a power interface of the electronic device 200 may be different interfaces. The electronic device 200 may be supplied with power from the user device, as well as the vehicle (e.g., through an auxiliary power outlet of the vehicle). The electronic device 200 may be supplied with power through the power interface. By the supplied power, the battery of the electronic device 200 may be charged or the electronic device may be driven.

In an embodiment, the electronic device 200 may further include the manipulation unit 240. The manipulation unit 240 of the electronic device 200 may be used to manipulate the user device connected to the electronic device 200 through the communication interface 230. The manipulation unit 240 of the electronic device 200 may be used to select a button displayed on a screen of the electronic device 200. For example, through the manipulation unit 240, inputs corresponding to 'Back', 'Next', and 'Select' may be made, but the manipulations are not limited thereto. The manipulation unit 240 may be implemented as a touch pad, but also may be implemented as a joystick, a straight pad, a cross pad, a physical button, or the like in order to improve the feeling of manipulation. An input corresponding to 'Select' may be made by pressing down the joystick, and inputs corresponding to 'Next' and 'Back' may be made or the cursor may be moved by tilting the joystick in a certain direction. Similarly, an input corresponding to 'Select' may be made by pressing down the center of the straight pad or the cross pad, and inputs corresponding to 'Next' and 'Back' may be made or the cursor may be moved by pressing the pad in a certain direction. The manipulation unit 240 may be implemented as a single button, and respective operations may be performed by the user device according to button inputs (e.g., a tap, a double tap, a long tap, etc.). The manipulation unit 240 may be implemented as a separate part from the electronic device 200. For example, the electronic device 200 and the manipulation unit 240 may be connected to each other through a wire or may be connected to each other through a wireless communication interface. The manipulation unit 240 may include a separate communication interface from the electronic device 200, and the manipulation unit 240 may be connected to the user device through the separate communication interface to receive the above-described inputs for manipulation.

Because the earnings of a delivery driver are proportional to the number of completed delivery tasks, some delivery drivers manipulate their smart phones while driving, which may lead to a serious accident. The electronic device 200 according to an embodiment may be installed on the steering wheel of a two-wheeled vehicle, and the driver of the two-wheeled vehicle may manipulate his or her smart phone connected to the electronic device 200 through the communication interface 230, by using the manipulation unit 240 of the electronic device 200, thereby reducing the probability of the occurrence of an accident.

In an embodiment, based on data obtained through the sensor 210 of the electronic device 200, it may be determined whether the electronic device 200 is moving, for example, whether the vehicle installed with the electronic device 200 is moving. The electronic device 200 may be implemented such that, when the electronic device 200 is moving, the user is unable to directly control the user device but is able to control the user device through the manipulation unit 240.

According to embodiments, the electronic device 200 may include more or fewer units than the units described above. The units of the electronic device 200 are named to distinctively explain their operations, which are performed by the electronic device 200, and thus, a particular operation should not be construed as necessarily being performed by a particular unit. For example, an operation described as being performed by a particular unit of the electronic device 200 may be performed by another unit, an operation described as being performed by one unit of the electronic device 200 may be performed by a plurality of units, and an operation described as being performed by interactive processing by a plurality of units of the electronic device 200 may be performed by one unit. Furthermore, an operation described as being performed by the electronic device 200 may be performed by another device or may be performed with the help of another device.

According to embodiments, each of the aforementioned units of the electronic device 200 may include sub-units. The sub-units of a unit may be more or fewer than the sub-units described above. Like the units of the electronic device 200, the sub-units are named to distinctively explain their operations, which are performed by the electronic device 200, and thus, a particular operation should not be construed as necessarily being performed by a particular sub-unit. A unit and sub-units may or may not be in a hierarchical relationship with each other.

Figure 3A:
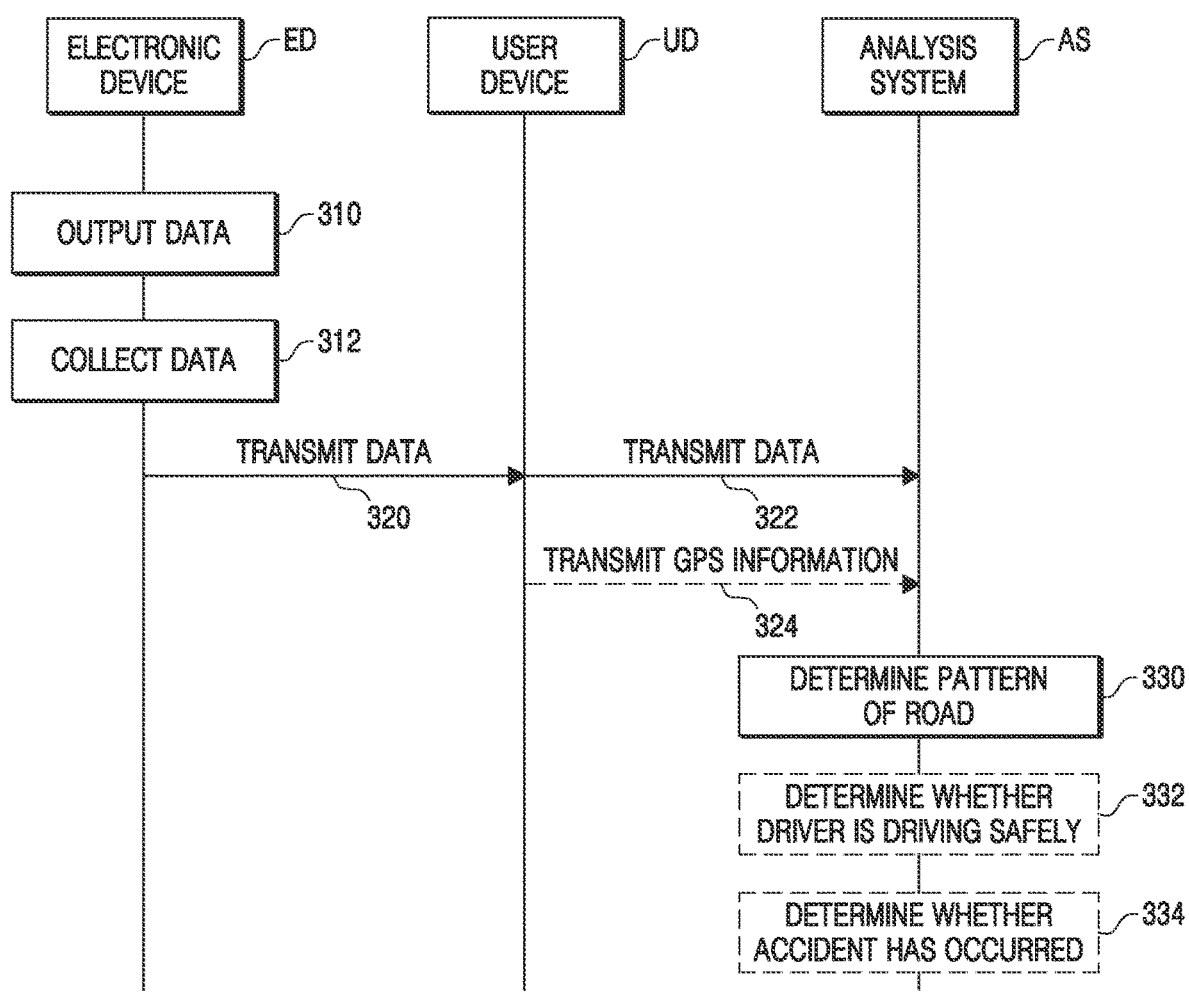
FIG. 3A is a diagram for describing interactions between an electronic device, a user device, and an analysis system, according to an embodiment.

FIG. 3A is a diagram for describing interactions between an electronic device, a user device, and an analysis system, according to an embodiment.

In operation 310, an electronic device ED may output data detected by a sensor. That is, the sensor of the electronic device ED may output the detected data to a processor of the electronic device ED, and then the processor may obtained the output data.

In operation 312, the electronic device ED may collect the output data. Because immediately transmitting the output data to the electronic device ED may waste resources of the electronic device ED and a user device UD, the data may be collected for a certain time period and then transmitted to the electronic device ED. The certain time period may vary depending on the state of communication interfaces of the electronic device ED and the user device UD.

In operation 320, the electronic device ED may transmit the collected data to the user device UD. The transmission of the data from the electronic device ED to the user device UD may be performed based on a certain time, but is not limited thereto. For example, the transmission may be performed based on whether the amount of the collected data reaches a certain value. The electronic device ED may encode the collected data in a certain manner and transmit resulting code to the user device UD.

In operation 322, the user device UD may transmit, to an analysis system AS, the data transmitted from the electronic device ED. The user device UD may transmit, to the analysis system AS, the data transmitted from the electronic device ED. The data transmitted from the electronic device ED may be at least one of acceleration data, gyro data, and geomagnetic data of the electronic device ED, but is not limited thereto. In a case in which the electronic device ED further includes another sensor, data collected by the sensor may also be received from the electronic device ED. For example, in a case in which the electronic device ED includes a GPS sensor, GPS information of the electronic device ED may be received by the user device UD. Operation 322 may be performed immediately after operation 320 is completed, but is not limited thereto. For example, operation 322 may be performed when the user device UD is connected to a Wi-Fi network, or at a certain time point.

In operation 324, the user device UD may transmit the GPS information to the analysis system AS. The GPS information may be GPS information of the electronic device ED, but is not limited thereto. For example, the GPS information may be GPS information of the user device UD. In a case in which the electronic device ED and the user device UD are connected to each other through a short-range communication interface or a wired communication interface, the GPS information of the user device UD may be actually used as GPS information of the electronic device ED. The GPS information may be utilized in evaluating a driver or when an accident has occurred, which is described below with reference to FIGS. 7 and 8.

In operation 330, the analysis system AS may determine a pattern of a road below the electronic device ED based on the received data. A method, performed by the analysis system AS, of determining the pattern of the road below the electronic device ED based on the received data is described below with reference to FIGS. 4 to 6.

In an embodiment, according to the determining of the pattern of the road below the electronic device ED, it may be determined whether the road under the electronic device ED is a roadway or a sidewalk. In a case in which it is determined that the road below the electronic device ED is a sidewalk, a message may be transmitted to the driver of the vehicle and/or a third party for notifying that the vehicle is driving on the sidewalk. According to an embodiment, the number of times the driver drives on a sidewalk may be counted, and it may be determined, based on an accumulated result of the counting, whether the driver is driving safely. That is, the operation record analysis system AS may be implemented to evaluate the driver as a reckless driver when the number of times the driver drives a sidewalk is absolutely high or relatively high.

In an embodiment, the analysis system AS may use the GPS information transmitted from the user device UD and the data collected by the electronic device ED to determine the pattern of the road below the electronic device ED.

In operation 332, the analysis system AS may determine whether the driver is driving safely based on the received data. Determining whether a driver is driving safely is described below with reference to FIG. 7.

In operation 334, the analysis system AS may determine, based on the received data, whether the driver has gotten into an accident. Determining whether a driver has gotten into an accident is described below with reference to FIG. 8.

Figure 3B:
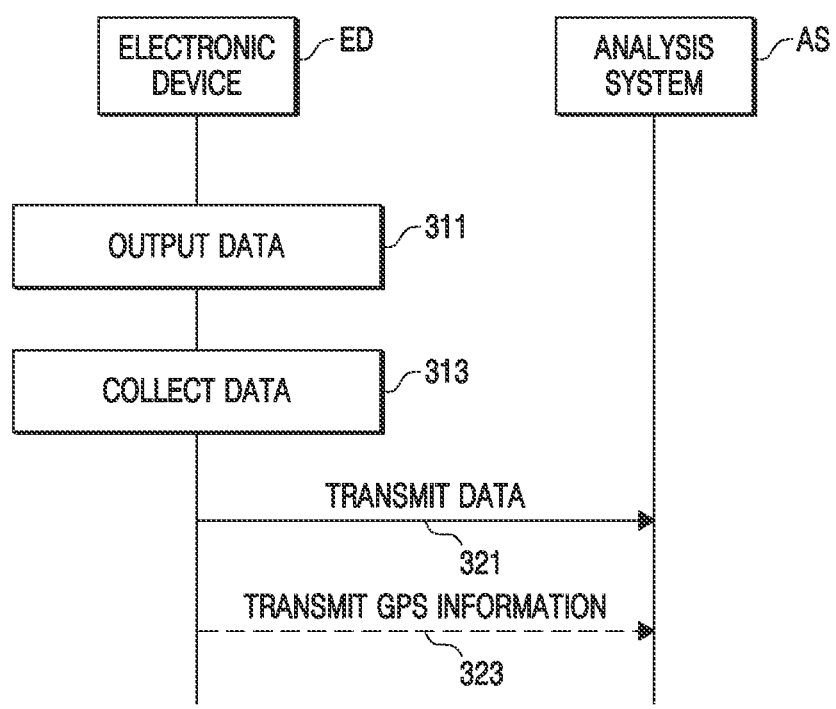
FIG. 3B is a diagram for describing interactions between an electronic device and an analysis system, according to an embodiment.

FIG. 3B is a diagram for describing interactions between an electronic device and an analysis system, according to an embodiment.

Operations 311 and 313 of FIG. 3B are substantially the same as operations 310 and 312 of FIG. 3A, and thus, redundant descriptions thereof are omitted.

In an embodiment, the electronic device ED may be implemented to directly communicate with the analysis system AS. For example, the electronic device ED may include a long-range communication interface. In this case, operations 322 and 324 performed the user device UD in FIG. 3A may be performed by the electronic device ED.

In operation 321, the electronic device ED may transmit collected data to the analysis system AS. Transmission of the data from the electronic device ED to the analysis system AS may be performed based on a certain time, but is not limited thereto. For example, the transmission may be performed based on whether the amount of the collected data reaches a certain value. The electronic device ED may encode the collected data in a certain manner and transmit resulting code to the analysis system AS.

Operation 321 may be performed immediately after operation 320 is completed, but is not limited thereto. For example, operation 321 may be performed when the electronic device ED is connected to a Wi-Fi network, or at a certain time point.

The data transmitted from the electronic device ED may be at least one of acceleration data, gyro data, and geomagnetic data of the electronic device ED, but is not limited thereto. In a case in which the electronic device ED is further include another sensor, data collected by the sensor may also be transmitted from the electronic device ED to the analysis system AS. For example, in operation 323, the electronic device ED may transmit GPS information to the analysis system AS. The GPS information may be utilized in evaluating a driver or when an accident has occurred, which is described below with reference to FIGS. 7 and 8.

Figure 4:
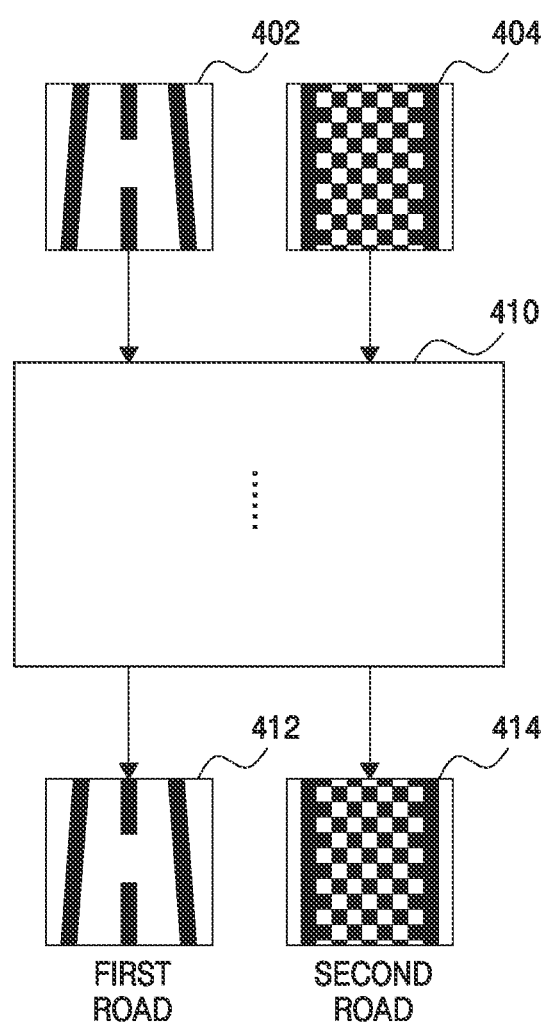
FIG. 4 is a diagram for describing a method, performed by an artificial neural network, of learning patterns of roads by using images, according to an embodiment.

FIG. 4 is a diagram for describing a method, performed by an artificial neural network model, of learning patterns of roads by using images, according to an embodiment. For convenience of description, the method is described with further reference to FIGS. 5 and 6.

Figure 5:
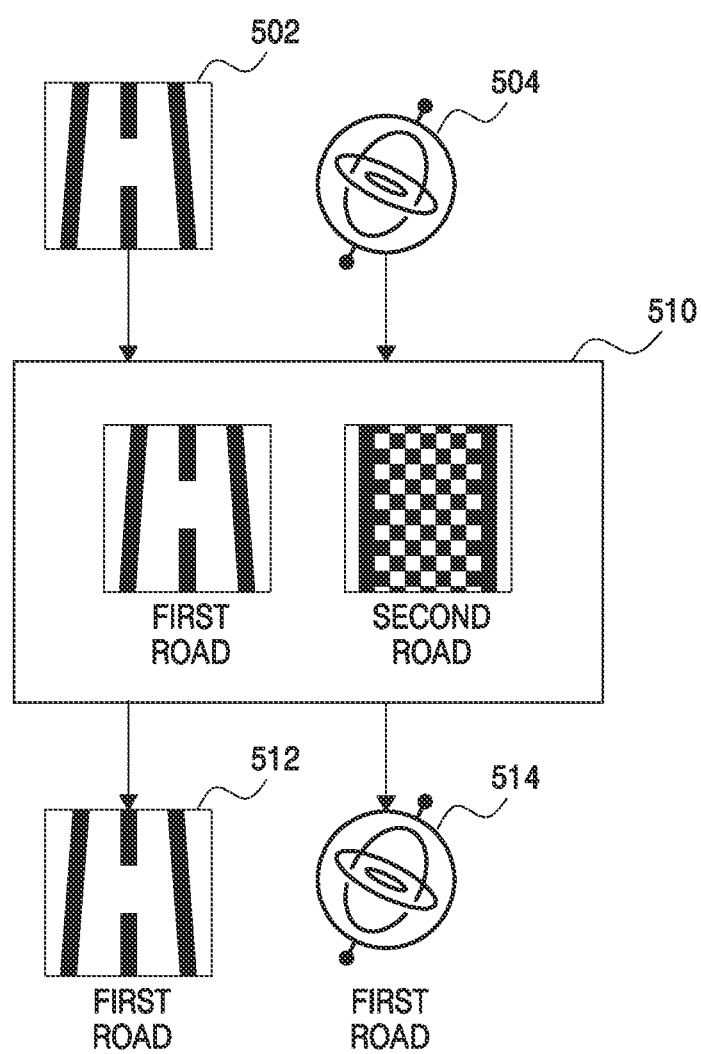
FIG. 5 is a diagram for describing a method, performed by an artificial neural network, of learning patterns of roads by using images and vehicle sensing data, according to an embodiment.

FIG. 5 is a diagram for describing a method, performed by an artificial neural network, of learning patterns of roads by using images and vehicle sensing data, according to an embodiment.

Figure 6:
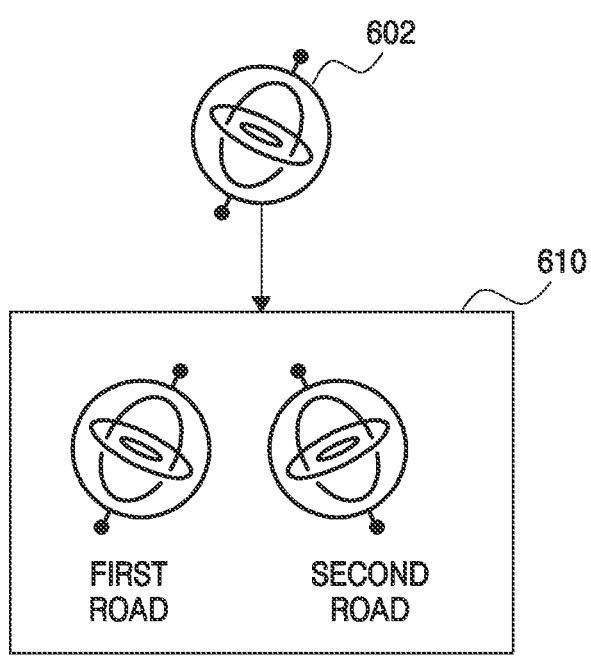
FIG. 6 is a diagram for describing a method, performed by an artificial neural network, of determining a pattern of a road by using vehicle sensing data, according to an embodiment.

FIG. 6 is a diagram for describing a method, performed by an artificial neural network, of determining a pattern of a road by using vehicle sensing data, according to an embodiment.

Artificial intelligence-related functions according to the disclosure are operated by a processor and a memory. The processor may include one or more processors. In this case, the one or more processors may be, but is not limited to, a general-purpose processor such as a central processing unit (CPU), an application processor (AP), or a digital signal processor (DSP), a dedicated graphics processor such as a graphics processing unit (GPU) or a vision processing unit (VPU), or a dedicated artificial intelligence processor such as a neural processing unit (NPU). The one or more processors may perform control to process input data according to predefined operation rules or an artificial intelligence model stored in the memory. Alternatively, in a case in which the one or more processors are dedicated artificial intelligence processors, the dedicated artificial intelligence processor may be designed with a hardware structure specialized for processing a particular artificial intelligence model.

Referring to FIG. 4, in a case in which an artificial neural network model 410 is trained to learn a first road image 402 and a second road image 404, the trained artificial neural network model may determine whether each of the input images 402 and 404 is a first road 412 or a second road 414. The images 402 and 404 input to the artificial neural network model 410 may be images of environments below or around the electronic device. The learning of the artificial neural network model 410 may be performed based supervised learning, but is not limited thereto, and the artificial neural network model 410 may be an existing image classification artificial neural network model 410. In the present disclosure, it is assumed that the first road 412 is a roadway and the second road 414 is a sidewalk, but the first road 412 and the second road 414 are not limited thereto, and the artificial neural network model 410 may be implemented to determine not only two, but also three or more road types. For example, the road types may include features that may be visually identified from surfaces of roads, such as asphalt, cement, crosswalk, braille block, curbstone, sidewalk block, drain cover, manhole cover, or unpaved road, and the artificial neural network model 410 may be trained to distinguish between all of such road types.

The predefined operation rules or the artificial intelligence model may be generated via a training process. By training the artificial intelligence model based on a plurality of pieces of training data by using a learning algorithm, the predefined operation rules or the artificial intelligence model may be generated to perform a desired task (or purpose). Such training may be performed by the above-described operation record analysis system, but is not limited thereto. Examples of the learning algorithm may include supervised learning, unsupervised learning, semi-supervised learning, or reinforcement learning, but are not limited thereto, and the artificial neural network model 410 may be trained in an appropriate manner to perform a given task (or purpose). The artificial neural network models 410 and 510 trained based on the images 402 and 404 of FIG. 4 may determine the road type of an input image. Therefore, when an image 502 is input to the artificial neural network model 510 together with sensing data 504, which is obtained by the electronic device in association with (or simultaneously with) a time point at which the image 502 is captured, that is, at least one of acceleration data, gyro data, and geomagnetic data, the artificial neural network model 510 may map the sensing data 504 to the road image 502. The image 502 may be an image of an environment below or around the electronic device. The artificial neural network model 510 may determine a road type based on an image as described above with reference to FIG. 4, and may determine the input image 502 as a first road 512 as illustrated in FIG. 5. Because the sensing data 504 is obtained at a time point at which the input image 502 is captured, or during a certain period around that time point, the sensing data 504 may also be labeled as the first road, and the artificial neural network model 510 that is trained based on labeled sensing data 514 may determine the type of a road based on input sensing data. That is, the artificial neural network models 510 and 610, which are trained based on the sensing data 504 of FIG. 5 and the image 502 captured when the sensing data 504 is obtained, or within a period of obtaining of the sensing data 504, may determine a road type based on input sensing data 602.

In an embodiment, the artificial neural network models 510 and 610 may be pre-trained by using motion sensing data collected from an electronic device for data collection. The electronic device for data collection is named to explain that the artificial neural network models 510 and 610 may have been pre-trained by using data collected from the electronic device, and thus, the role of the electronic device is not limited by its name. The electronic device for data collection and the motion sensing data collected therefrom may be referred to as a second electronic device and second motion sensing data, respectively. The pattern of a road on which a vehicle installed with a first electronic device is driving may be determined by using the artificial neural network model 510 or 610 trained based on motion sensing data collected from the electronic device for data collection.

The road on which the vehicle installed with the electronic device is driving may be identified based on data sensed by the electronic device, for example, at least one of acceleration data, gyro data, and geomagnetic data, according to the material of the road, an even surface of the road, a paint applied onto the road, etc.

For example, data obtained by the electronic device sensing a roadway may indicate a prolonged relatively more stable state than those of other types of roads, and the artificial neural network models 510 and 610 may learn aspects of the stable state in the sensed data, and thus may determine, based on data obtained from the electronic device, whether the road below the electronic device is a roadway. Furthermore, when the movements of drivers on a roadway are similar to each other, for example, when it is determined that a plurality of users are driving in an 'S' shape at the same location on a straight road, it may be determined that there is an abnormality in the surface condition of the location, and such an issue may be reported to a third party TP. The third party TP may be an entity responsible for managing the corresponding road, but is not limited thereto.

For example, data obtained by the electronic device sensing an unpaved road may indicate a prolonged relatively unstable state, and the artificial neural network models 510 and 610 may learn aspects of the unstable state in the sensed data, and thus may determine, based on data obtained from the electronic device, whether the road below the electronic device is an unpaved road.

For example, data obtained by the electronic device sensing a sidewalk may indicate repetitive changes (peaks, valleys, or fluctuations) due to sidewalk blocks, and the artificial neural network models 510 and 610 may learn the repetitive changes in the sensed data, and thus may determine, based on data obtained from the electronic device, whether the road below the electronic device is a sidewalk. Furthermore, it may be determined whether the vehicle installed with the electronic device is driving on an uneven sidewalk. For example, data obtained by the electronic device sensing a sidewalk having an uneven surface formed by its sidewalk blocks may indicate continuous changes (peaks, valleys, or fluctuations), and the artificial neural network models 510 and 610 may learn the continuous changes in the sensed data, and thus may determine, based on data obtained from the electronic device, whether the road below the electronic device has an uneven surface. That is, data obtained by sensing an uneven sidewalk indicates changes (peaks, valleys, or fluctuations) for a certain time period, unlike a case of a curbstone. Detection of an uneven road surface may be reported to the third party TP. The third party TP may be an entity responsible for managing the corresponding road, but is not limited thereto.

For example, when the vehicle is driving on a crosswalk in the same direction as does a pedestrian walking on the crosswalk, data obtained by the electronic device sensing the road may indicate repetitive changes (peaks, valleys, fluctuations) due to a stripe pattern of the crosswalk, and the artificial neural network models 510 and 610 may learn the repetitive changes in the sensed data, and thus may determine, based on the data obtained from the electronic device, whether the vehicle installed with the electronic device is driving on a crosswalk in the same direction as does a pedestrian walking on the crosswalk.

For example, data obtained by the electronic device sensing a boundary stone (e.g., a braille block or a curbstone), a drain (e.g., a cover of a drainage facility), a manhole cover, or the like may indicate sudden changes (peaks, valleys, fluctuations), and the artificial neural network models 510 and 610 may learn aspects of the sudden changes in the sensed data, and thus may determine, based on the data obtained from the electronic device, whether the vehicle installed with the electronic device is driving on a boundary stone, a drain, a manhole cover, or the like. The artificial intelligence model may include a plurality of neural network layers. The artificial intelligence model may also be referred to as an artificial neural network model, a neural network model, an artificial neural network, a neural network, or the like. Each of the plurality of neural network layers has a plurality of weight values, and performs a neural network operation through an operation between an operation result of a previous layer and the plurality of weight values.

The plurality of weight values in each of the plurality of neural network layers may be optimized by a result of training the artificial intelligence model. For example, the plurality of weight values may be refined to reduce or minimize a loss or cost obtained by the artificial intelligence model during the training process. The artificial neural network may be, but is not limited to, a deep neural network (DNN), a convolutional neural network (CNN), a recurrent neural network (RNN), or the like.

Because the size of sensing data obtained by the electronic device according to an embodiment is generally smaller than the size of an image captured by a camera or a dashboard camera, the electronic device according to an embodiment may also be installed in a vehicle that is unable to receive continuous power unlike four-wheeled vehicles, for example, a personal mobility vehicle or a two-wheeled vehicle.

Analyzing images in real time to determine whether a driver is driving safely results in dramatic increases in costs required for an analyst to perform analysis and costs required for a drive to perform data communication. In contrast, according to an embodiment, sensing data obtained through the IMU sensor of the electronic device is only transmitted from a driver, and thus, data communication costs may be reduced compared to a case of using images, and the amount of data to be analyzed by an analyst in real time may also be reduced.

Although FIGS. 4 to 6 illustrates an example in which the artificial intelligence model is trained based on images, the artificial intelligence model may also be trained based on sensing data.

In an embodiment, according to an item to learn (or to be detected), at least one of acceleration data, gyro data, and geomagnetic data may be selected or weighted thereon.

For example, road types shows more conspicuous changes (peaks, valleys, or fluctuations) in acceleration data than in gyro data or geomagnetic data. That is, a road type, for example, whether the vehicle is driving on a driving road (e.g., an asphalt or cement road or an unpaved road), a boundary stone (e.g., a braille block or a curbstone), a drain (e.g., a cover of a drainage facility), a manhole cover, a crosswalk or the like, may be determined based on acceleration data obtained from the electronic device.

For example, collision of the vehicle, the amount of impact, an impact force, an impact direction, the degree of deceleration/acceleration (e.g., sudden braking/sudden acceleration), and an engine state may be determined based on acceleration data obtained during driving. That is, these items show more conspicuous changes (or peaks, valleys, or fluctuations) in acceleration data than in gyro data or geomagnetic data.

For example, it may be determined, based on geomagnetic data obtained during driving, whether the vehicle is driving horizontally across a road or whether the vehicle is making a U-turn. That is, these items show more conspicuous changes (or peaks, valleys, or fluctuations) in geomagnetic data than in acceleration data or gyro data. Meanwhile, whether the vehicle is driving horizontally across a road, that is, whether the vehicle is driving on a crosswalk, may be determined by further considering GPS and map information. Meanwhile, whether the vehicle is making an illegal U-turn may be further determined by further considering traffic signal information.

For example, it may be determined, based on gyro data obtained during driving, whether the vehicle is rolling, is pitching, is yawing, is weaving, is acrobatically driving, is in a wheelie position, is driving in an 'S' shape, has fallen down (while driving or stopped), is driving on an uphill road or a downhill road, or the like. That is, these items show more conspicuous changes (or peaks, valleys, or fluctuations) in gyro data than in acceleration data or geomagnetic data.

In an embodiment, the above-described items may be determined based on one type of data, i.e., acceleration data, gyro data, or geomagnetic data, but may also be determined from a combination of the data types.

In an embodiment, a greater weight may be applied to data showing a more conspicuous change for the analysis system to determine a particular item, but the present disclosure is not limited thereto. The weight may be adjusted by using an artificial neural network.

The present disclosure is not limited to the information described above, and various pieces of information may be obtained based on values measured by a sensor, and it may be determined, based on the obtained various pieces of information, whether the driver is driving safely.

As external information, various pieces of information as well as a traffic signal system, GPS information, and map information may be used. The external information is described below with reference to FIGS. 7 and 8.

Figure 7:
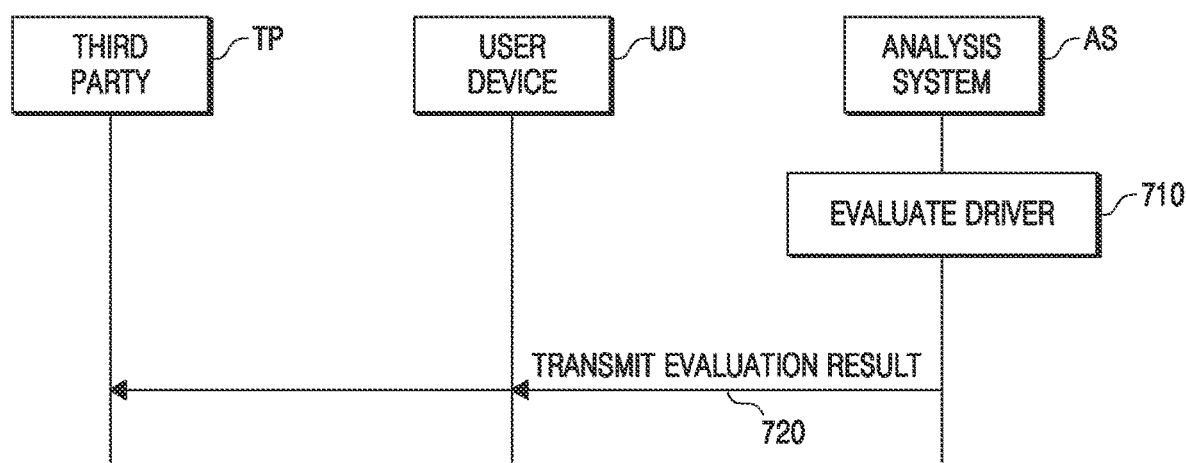
FIG. 7 is a diagram for describing a method of using an operation record analysis result according to an embodiment.

FIG. 7 is a diagram for describing a method of using an operation record analysis result according to an embodiment.

FIG. 7 is a diagram for describing operations to be performed after operations 310, 312, 320, and 322 of FIG. 3A or operations 311, 313, and 321 of FIG. 3B are performed.

In operation 710, the analysis system AS may evaluate a driver based on sensing data of the electronic device. For example, the analysis system AS may determine whether the driver is driving on a sidewalk, the speed of driving, a pattern of driving, etc. When the driver is driving on a sidewalk at a speed higher than a certain speed, or when the driver is driving on a sidewalk while making a stagger or turning the steering wheel at a certain angle or greater, the driver may be determined as a reckless driver.

In operation 720, an evaluation result may be transmitted to the user device UD and the third party TP. The transmission to the third party TP may require prior permission or consent of the user (i.e., the driver). Once the user's consent is obtained, user evaluation results may be transmitted to the third party TP without further consent, but is not limited thereto, and every transmission of a user evaluation result may require the user's consent. In an embodiment, the electronic device may include a communication interface for communicating with the analysis system AS, in which case the evaluation result may be transmitted directly from the analysis system AS to the electronic device.

In an embodiment, the driver evaluation result may be transmitted from the analysis system AS to only the third party TP.

In an embodiment, a first driver evaluation result to be transmitted to the user device UD (or an electronic device including a communication interface for communicating with the analysis system AS) and a second driver evaluation to be transmitted to the third party TP may be different from each other. For example, the second driver evaluation result may include only some components filtered from the first driver evaluation result. The range of the filtering may be determined by the user or may vary depending on the third party TP, but is not limited thereto. Transmission of a driver evaluation result may be performed whenever driving is finished, every day, every week, every month, etc., but is not limited thereto. Time points and periods of transmission the first driver evaluation result and the second driver evaluation result may be different from each other. In an embodiment, in order to prevent the user from being bothered by too much information, the first driver evaluation result to be transmitted to the user device UD may include only some components of the second driver evaluation result to be transmitted to the third party TP.

Unlike four-wheeled vehicles that run parallel to a road, a two-wheeled vehicle driving on a curve leans toward the road. Accordingly, in a case in which the vehicle installed with the electronic device is a two-wheeled vehicle, in evaluation of the driver, it may be determined whether the driver is recklessly driving based on the inclination of the electronic device, that is, the two-wheeled vehicle. It may be determined, based on sensing data obtained from the electronic device, whether and the extent to which the vehicle is inclined. Based on whether and the extent to which the vehicle is inclined, it may be determined whether the two-wheeled vehicle is weaving, is driving in an 'S' shape, is acrobatically driving, is making a U-turn, etc., and such items may be reflected in a reckless driving history of the driver.

In an embodiment, GPS information may be further transmitted from the user device UD to the analysis system AS, and the analysis system AS may evaluate the driver based on the GPS information and the sensing data of the electronic device. For example, the analysis system AS may evaluate whether the driver is driving the vehicle safely or recklessly, based on the sensing data of the electronic device and the GPS information. For example, based on the GPS information and acceleration data, it may be determined whether the vehicle is driving in the wrong direction.

Unlike four-wheeled vehicles that only drive on a roadway, some two-wheeled vehicles drive on a sidewalk or cross between the road and sidewalk. Driving on the boundary between a roadway and a sidewalk involves a strong shake, and thus, a peak, a valley, a fluctuation, or the like may appear in the acceleration data.

In an embodiment, the analysis system AS may further consider a traffic signal information to evaluate the driver. Based on the traffic signal information and the GPS information, it may be determined whether the driver is violating a traffic signal, is following traffic safety rules, is making an illegal U-turn, etc.

In an embodiment, the analysis system AS may further consider the GPS information and map information to evaluate the driver. For example, driving behaviors of the driver may be determined critically in a mobility-disadvantaged-persons protection zone (e.g., a school zone or a senior protection zone), and a threshold for determining reckless driving in such an area may be less than those in other areas.

In an embodiment, a greater weight may be applied to a signal detected by the electronic device associated with the vehicle (e.g., a two-wheeled vehicle) than that applied to external information, but the present disclosure is not limited thereto. That is, a greater weight may be applied to external information than that applied to data collected by the electronic device.

Figure 8:
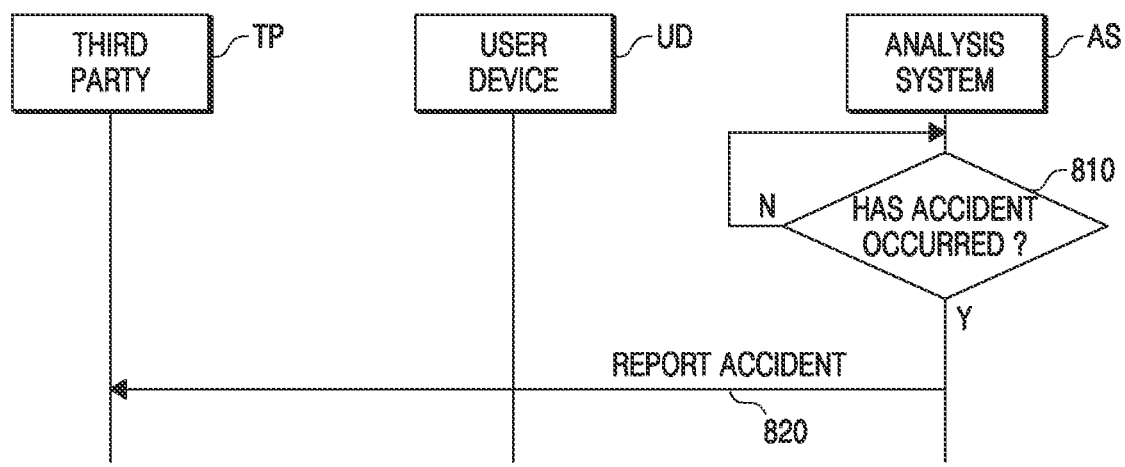
FIG. 8 is a diagram for describing a method of using an operation record analysis result according to an embodiment.

FIG. 8 is a diagram for describing a method of using an operation record analysis result according to an embodiment.

FIG. 8 is a diagram for describing operations to be performed after operations 310, 312, 320, and 322 of FIG. 3A or operations 311, 313, and 321 of FIG. 3B are performed.

In operation 810, the analysis system AS may determine, based on sensing data transmitted from an electronic device, whether an accident has occurred. For example, when it is determined, based on a result of analyzing the sensing data from the electronic device, that the vehicle has fallen down with a sudden change in acceleration, in operation 820, the analysis system AS may report an accident to the third party TP. Here, the third party TP may be to which an accident may be reported, such as an emergency and rescue service, but is not limited thereto. As delivery may be impossible or delayed due to the occurrence of the accident, the analysis system AS may also report the accident to a person who has hired the delivery driver. When an accident has occurred, the accident may be reported not only to the third party TP but also to the user of the electronic device ED. For example, when it is determined, based on sensing data transmitted from the electronic device ED, that the vehicle installed with the electronic device ED has gotten into an accident, the accident may be reported to the electronic device ED or the user device UD connected to the electronic device ED. When the accident is reported to the electronic device ED or the user device UD connected to the electronic device ED, a message for checking whether the user, i.e., the driver of the vehicle, is fine may be displayed. When the user does not respond to the message within a certain time period, the accident may be reported to an emergency service.

The report of the accident transmitted to the third party TP may include information about the accident. For example, when it is determined, based on data obtained from the electronic device ED, that the vehicle installed with the electronic device ED has fallen down with a sudden change in acceleration, the information about the accident may include information that the vehicle has fallen down. Depending on the change in or the direction of the acceleration, the information about the accident may include information about the direction, position, and process in which the vehicle has fallen down, the direction, position, and process in which the vehicle has overturned, etc. The information about the accident may include texts, images, videos, etc. Here, the images and the videos may be images and videos obtained by reproducing the accident based on data obtained from the electronic device ED. The information about the accident may include information about the road. For example, the information about the accident may include information about whether the road on which the accident has occurred is a roadway, a sidewalk, an unpaved road, or an uneven road, etc.

Although it is described herein that the analysis system AS is a single entity, the analysis system AS may be divided into a plurality of servers. For example, the analysis system AS may include a server that analyzes sensing data of the electronic device, a server that evaluates the driver based on a result of the analyzing, a server that reports an accident based on a result of the analyzing, a server that learns the sensing data, etc.

In an embodiment, the electronic device ED may be installed in a vehicle, and the analysis system AS may determine, based on vibration of the vehicle detected when the vehicle is driving and/or has stopped, whether the vehicle is abnormal. It may be determined, based on data previously obtained from the electronic device ED, whether the vehicle is abnormal. That is, when the amount of accumulated sensing data is greater than or equal to a certain reference value, and data that is out of a certain range around the average of the accumulated data is obtained, it may be determined that the vehicle is abnormal. In this case, environmental factors, for example, temperature and humidity, may be further considered. When it is determined that the vehicle is abnormal, the analysis system AS may transmit a message about inspection of the vehicle to the user device UD or the electronic device (when it includes a communication interface for communicating with the analysis system AS). The analysis system AS, as a third party, may transmit the message about inspection of the vehicle to a vehicle inspection company.

In an embodiment, sensing data obtained from the electronic device may be corrected based on a predefined criterion. For example, at least one of acceleration data, gyro data, and geomagnetic data may be corrected based on the acceleration data (e.g., the direction of gravity) of the electronic device. Accordingly, the influence on the location or direction in which the electronic device is installed may be reduced. For example, based on GPS information of the user device, the acceleration (or velocity) and yawing (heading direction) of the electronic device may be corrected. For example, the heading direction and inclination of the electronic device may be corrected based on the geomagnetic data.

In an embodiment, data may be corrected by calibrating a sensor of the electronic device, but previously obtained data may be corrected based on other data. The calibration may be performed by the electronic device and/or the analysis system.

Methods implemented as software modules or algorithms may be stored in a computer-readable recording medium, as computer-readable code or program instructions executable by the processor. Here, examples of the computer-readable recording medium may include magnetic storage media (e.g., read-only memory (ROM), random-access memory (RAM), floppy disks, hard disks, etc.) and optical storage media (e.g., a compact disk ROM (CD-ROM), a digital versatile disc (DVD), etc.). The computer-readable recording medium may be distributed in computer systems connected via a network and may store and execute computer-readable code in a distributed manner. The medium may be computer-readable, may be stored in a memory, and may be executed by a processor.

All references, including publications, patent applications, patents, etc. cited herein are hereby incorporated by reference to the same extent as if each reference were individually and specifically indicated to be incorporated by reference and were set forth in its entirety herein.

For the purposes of promoting understanding of the present disclosure, reference numerals are used in the preferred embodiments illustrated in the drawings, and particular terms are used to describe the embodiments of the present disclosure, however, the present disclosure is not limited by the terms, and the present disclosure should be construed to encompass all components that would normally occur to those skilled in the art.

The present disclosure may be represented by block components and various process operations. The functional blocks may be implemented by various numbers of hardware and/or software components that perform particular functions. For example, the present disclosure may employ various integrated circuit components, such as, memory elements, processing elements, logic elements, or look-up tables, which may carry out a variety of functions under control by one or more microprocessors or other control devices.

In a similar manner to that in which the components of the present disclosure may be executed with software programming or software elements, the present disclosure may be implemented with a scripting language or a programming language such as C, C++, Java, or assembler, including various algorithms implemented by a combination of data structures, processes, processes, routines or other programming configurations. The functional aspects may be implemented as algorithms executable by one or more processors. In addition, the present disclosure may employ related-art techniques for electronic configuration, signal processing, and/or data processing, etc. Terms such as "mechanism", "element", "unit", or "component" are used in a broad sense and are not limited to mechanical or physical components. Such terms may have the meaning of a series of routines of software in association with a processor or the like.

Specific executions described herein are merely examples and do not limit the scope of the present disclosure in any way. For the sake of conciseness, descriptions of related art electronic configurations, control systems, software, and other functional aspects of the systems may be omitted. In addition, the lines or connecting elements between elements shown in the drawings are intended to represent exemplary functional relationships and/or physical or logical couplings between the various elements, and many alternative or additional functional relationships, physical connections or logical connections may be present in a practical device. Moreover, no item or component is essential to the practice of the present disclosure unless the item or component is specifically described as "essential" or "critical".

The term 'the' and other demonstratives similar thereto in the specification of the present disclosure (especially in the following claims) should be understood to include a singular form and plural forms. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skilled in this art without departing from the following claims and equivalents thereof.

The device described above may be implemented as a hardware component, a software component, and/or a combination of a hardware component and a software component. For example, devices and components described in the embodiments may be implemented by using one or more general-purpose computers or special-purpose computers, such as a processor, a controller, an arithmetic logic unit (ALU), a digital signal processor, a microcomputer, a field-programmable gate array (FPGA), a programmable logic unit (PLU), a microprocessor, or any other device configured to execute and respond to instructions. The processor may execute an operating system (OS) and one or more software applications running on the operating system. The processor may also access, store, modify, process, and generate data in response to execution of software. Although some embodiments are described, for convenience of understanding, with reference to examples in which a single processor is used, one of skill in the art would understand that a processor may include a plurality of processing elements and/or a plurality of types of processing elements. For example, the processor may include one or more processors and one controller. In addition, other processing configurations are also possible, such as a parallel processor.

The invention claimed is:

1. A method comprising:
   obtaining, from an electronic device installed in a vehicle, first motion sensing data including first acceleration data, first geomagnetic data, and first gyro data of the electronic device, wherein the first motion sensing data represent motion of the electronic device; and
   determining, a pattern of a road below the electronic device by applying the obtained first motion sensing data to an artificial intelligence (AI) model trained based on mapping between second motion sensing data of other electronic devices and road images of roads driven by other vehicles in which the other electronic devices are installed, wherein the second motion sensing data of the other electronic devices are generated at the other electronic devices simultaneously with capturing the road images,
   wherein the road below the electronic device is a road on which the vehicle is driving, and
   wherein the second motion sensing data of the other electronic devices include second acceleration data, second geomagnetic data, and second gyro data of the other electronic devices, and represent motion of the other electronic devices.

2. The method of claim 1, wherein the pattern of the road below the electronic device is determined based on a repetitive change in the obtained first motion sensing data, and
   wherein the repetitive change in the obtained first motion sensing data include at least one of repetitive peaks, repetitive valleys, or repetitive fluctuations in the obtained first motion sensing data.

3. The method of claim 1, wherein the vehicle includes at least one of a two-wheeled vehicle, a personal mobility vehicle, a micromobility vehicle, or a smart mobility vehicle.

4. The method of claim 1, wherein the determining of the pattern of the road below the electronic device comprises determining whether the road below the electronic device is a roadway or a sidewalk.

5. The method of claim 1, further comprising:
   determining that the vehicle is not on safe driving based on determining that the road below the electronic device is a sidewalk.

6. The method of claim 1, wherein a weight is applied to the obtained first motion sensing data, and wherein the first motion sensing.

7. The method of claim 1, further comprising determining, based on the determined pattern of the road below the electronic device, whether the vehicle in which the electronic device is installed is on safe driving.

8. The method of claim 1, further comprising:
   evaluating a driver based on the determined pattern of the road below the electronic device; and
   transmitting a result of the evaluating of the driver, to at least one of the driver, a manager of the driver, a vehicle lessor of the driver, an employer of the driver, or an insurance company of the driver.

9. The method of claim 1, further comprising determining, based on the obtained first motion sensing data, whether the vehicle in which the electronic device is installed is weaving, is driving in an 'S' shape (is rolling), is acrobatically driving, is in a wheelie position, is in a front wheelie position, is making a U-turn, is diagonally driving, and is driving horizontally across the road.

10. The method of claim 1, further comprising determining, based on the obtained first motion sensing data, at least one of a collision, falling down, an amount of impact, an impact force, an impact direction, sudden braking, sudden acceleration, a slope of the road, or an engine state, with respect to a vehicle in which the electronic device is installed.

11. The method of claim 1, further comprising determining, based on GPS information associated with the electronic device and the obtained first motion sensing data, whether traffic safety rules are complied with.

12. The method of claim 1, wherein the determining of the pattern of the road below the electronic device comprises determining a road having a pattern most similar to the pattern of the road below the electronic device, among a roadway, a sidewalk, an unpaved road, and a crosswalk.

13. A computer-readable recording medium having recorded thereon a program that causes a computer to perform the method of claim 1.

14. A system comprising:
    a memory storing instructions; and
    at least one processor configured to execute the instructions to:
    obtain, from an electronic device installed in a vehicle, first motion sensing data including first acceleration data, first geomagnetic data, and first gyro data of the electronic device, wherein the first motion sensing data represent a motion of the electronic device, and
    determine, a pattern of a road below the electronic device by applying the obtained first motion sensing data to an artificial intelligence (AI) model trained based on mapping between second motion sensing data of other electronic devices and road images of roads driven by other vehicles in which the other electronic devices are installed, wherein the second motion sensing data of the other electronic devices are generated at the other electronic devices simultaneously with capturing the road images,
    wherein the road below the electronic device is a road on which the vehicle is driving, and
    wherein the second motion sensing data of the other electronic devices include acceleration data, geomagnetic data, and gyro data of the other electronic devices, and represent motions of the other electronic devices.

15. An electronic device comprising:
    at least one sensor configured to output first motion sensing data including first acceleration data, first geomagnetic data, or first gyro data, wherein the first motion sensing data represent a motion of the electronic device; and
    at least one processor configured to collect the output first motion sensing data such that a pattern of a road below the electronic device is determined by applying the output first motion sensing data to an artificial intelligence (AI) model trained based on mapping between second motion sensing data of other electronic devices and road images of roads driven by other vehicles in which the other electronic devices are installed, wherein the second motion sensing data of the other electronic devices are generated at the other electronic devices simultaneously with capturing the road images,
    wherein the road below the electronic device is a road on which the vehicle is driving,
    wherein the second motion sensing data of the other electronic devices include second acceleration data, second geomagnetic data, and second gyro data of the other electronic devices, and represent motions of the other electronic devices.

* * * * *